United States Patent [19]

Fukuma

[11] Patent Number: 5,106,190
[45] Date of Patent: Apr. 21, 1992

[54] DOUBLE-BEAM SPECTROPHOTOMETER USING A PHOTODIODE DETECTOR

[75] Inventor: Toshiaki Fukuma, Kyoto, Japan

[73] Assignee: Shimadzu Corporation, Kyoto, Japan

[21] Appl. No.: 405,248

[22] Filed: Sep. 11, 1989

[30] Foreign Application Priority Data

Sep. 24, 1988 [JP] Japan .................. 63-239139

[51] Int. Cl.$^5$ .................................. G01J 3/42
[52] U.S. Cl. ..................................... 356/325
[58] Field of Search ............... 356/319, 323, 324, 325

[56] References Cited

U.S. PATENT DOCUMENTS 3,522,739 8/1970 Coor et al. .............. 356/325 X
4,305,664 12/1981 Akitomo ..................... 356/323

OTHER PUBLICATIONS

Lue "Wavelength—Modulating Spectrometer Implemented With Photovoltaic Photodiodes" J. Phys. E: Sci. Instrum., vol. 12 #9, Sep. 1979, pp. 833-836.

*Primary Examiner*—Vincent P. McGraw
*Attorney, Agent, or Firm*—Armstrong, Nikaido, Marmelstein, Kubovcik & Murray

[57] ABSTRACT

A spectrophotometer comprising a light source, a spectroscope which separates the light of light source depending on the wavelengths, chops the light into the first and second light beams and allows the light beams to pass through the reference cell and sample cell, a photodiode which alternately receives the light beams from the reference cell and sample cell, a variable gain amplifier which amplifies a light current of photodiode, an A/D converter which converts and guides the reference output and sample output as the digital values synchronously with the chopping period, and a again setter which sets the gain of the variable gain amplifier depending on the reference output value from the A/D converter.

1 Claim, 2 Drawing Sheets

DOUBLE-BEAM SPECTROPHOTOMETER USING A PHOTODIODE DETECTOR

BACKGROUND THE OF THE INVENTION

The present invention relates to a spectrophotometer and particularly to a double-beam spectrophotometer.

In general, since the photoelectron multiplying function is just suitable for designing of a doublebeam type spectrophotometer, a photomultiplier is used as a detector in the spectrophotometer to conduct waveform scanning (for example U.S. Pat. No. 4,455,097).

An electrical block diagram of the spectrophotometer of the prior art utilizing the photomultiplier of this type is shown in FIG. 2.

In this spectrophotometer, the light from the light source 1 is once separated depending on the wavelength into various light beams, these are then chopped into the light beam passing through reference cell 3 and the light beam passing through a sample cell 4, such light beams are received by a photomultiplier 5. The optical current from photomultiplier 5 is amplified by a preamplifier 6, divided into the reference and sample currents by switches 7, 8. The reference signal is amplified by an amplifier 9 and is then fed back to the photomultiplier 5 through a negative voltage circuit 11, meanwhile the sample signal is amplified by an amplifier 10 and is then input to an A/D converter.

In this spectrophotometer, control is carried out so that the reference signal is fed back to a dinode of the photomultiplier 5 via the amplifier 9 and negative voltage circuit 11 to make constant the reference signal. The sample signal directly becomes a transmittance of sample and is subject to the A/D conversion under the condition that the reference signal is kept to a constant value and is then output as the data.

In the spectrophotometer of the prior art, a photomultiplier is used for a detector and it is certainly advantageous to use the photomultiplier for performing the photoelectron multiplying function. On the contrary, there is a disavantage in that the photomultiplier is very expensive and results in a rise of cost, of manufacture, further the electrical circuit is also complicated because it requires a negative voltage circuit and thereby the spectrophotometer as a whole becomes expensive.

SUMMARY OF THE INVENTION

The present invention has been proposed to over come the aforementioned problems and therefore it is an object of the present invention to provide a spectrophotometer which can be obtained at a low cost.

The spectrophotometer of the present invention comprises a light source (1), a spectroscope (2) which separates the light of light source depending on the wavelengths, chops the light into the first and second light beams and allows the light beams to pass through the reference cell (3) and sample cell (4). A photodiode (15) alternately receives the light beams from the reference cell and sample cell, and then a variable gain amplifier (17) amplifies a light current of photodiode. An A/D converter (18) converts and guides the reference output and sample output as the digital values synchronously with the chopping period, and a gain setter (19) sets the gain of the variable gain amplifier depending on the reference output value from the A/D converter.

In the spectrophotometer of the present invention, the reference light beam and sample light beam received by the photodiode are amplified by the variable gain amplifier and are then output after A/D conversion and the gain of variable gain amplifier is set to a constant value with the gain setter depending on an output from the reference cell among the outputs of the A/D converter. Thereafter, in case a sample signal is amplified by the variable gain amplifier via the photodiode 15, on the occasion of outputting an output of the A/D converter as the sample output, the sample signal is amplified with the same gain and is also output through the A/D converter. The spectrophotometer of the present invention utilizes a photodiode as the detector and moreover a negative voltage circuit is not used, and thus the apparatus as a whole can be constituted economically.

DETAILED DESCRIPTION OF THE PREFERRED EMBODIMENT

The present invention will be explained in further detail with reference to the following embodiment thereof.

Figure 1:
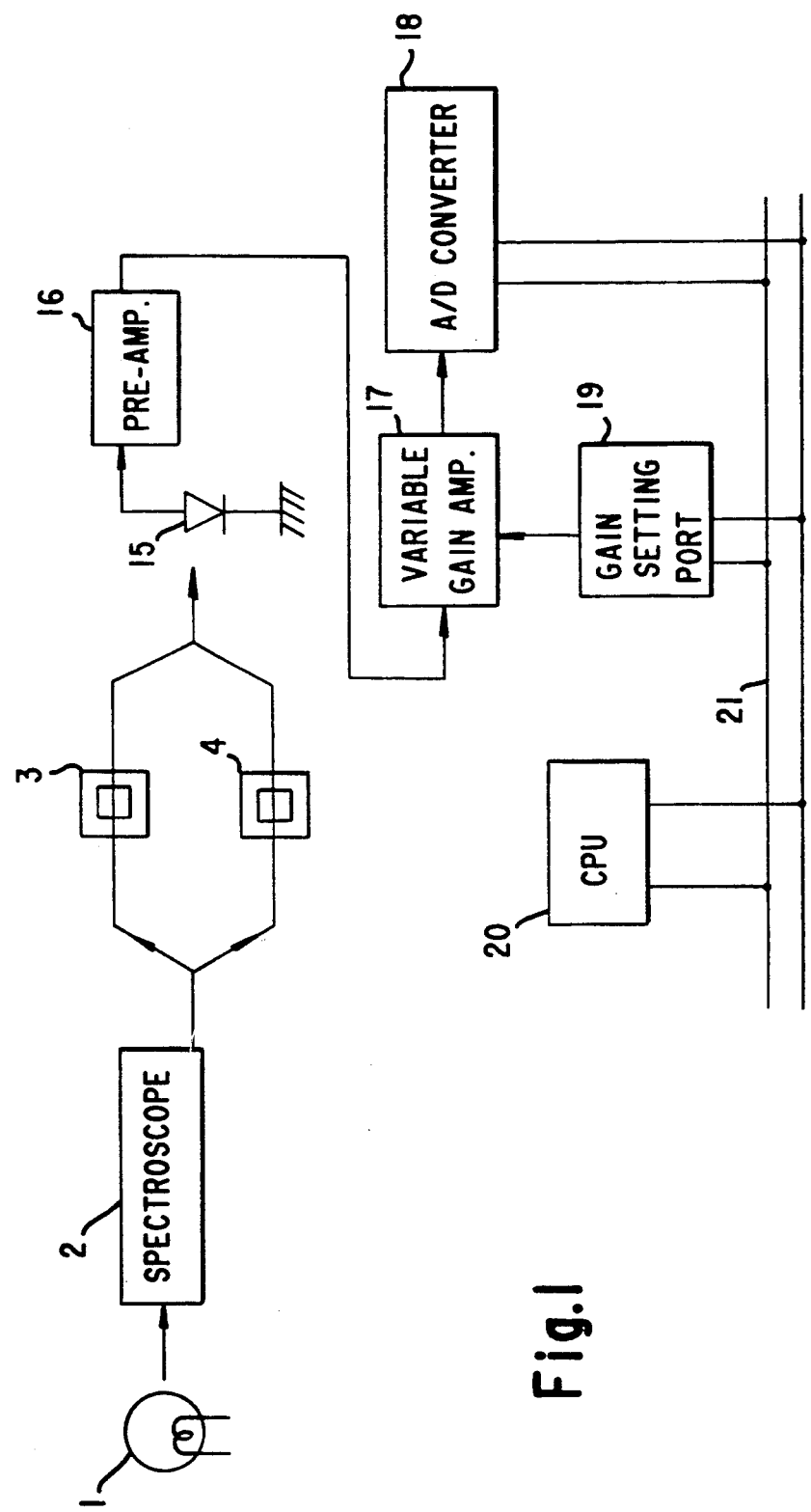
FIG. 1 is schematic diagram of a spectrophotometer as a preferred embodiment of the present invention.
Figure 2:
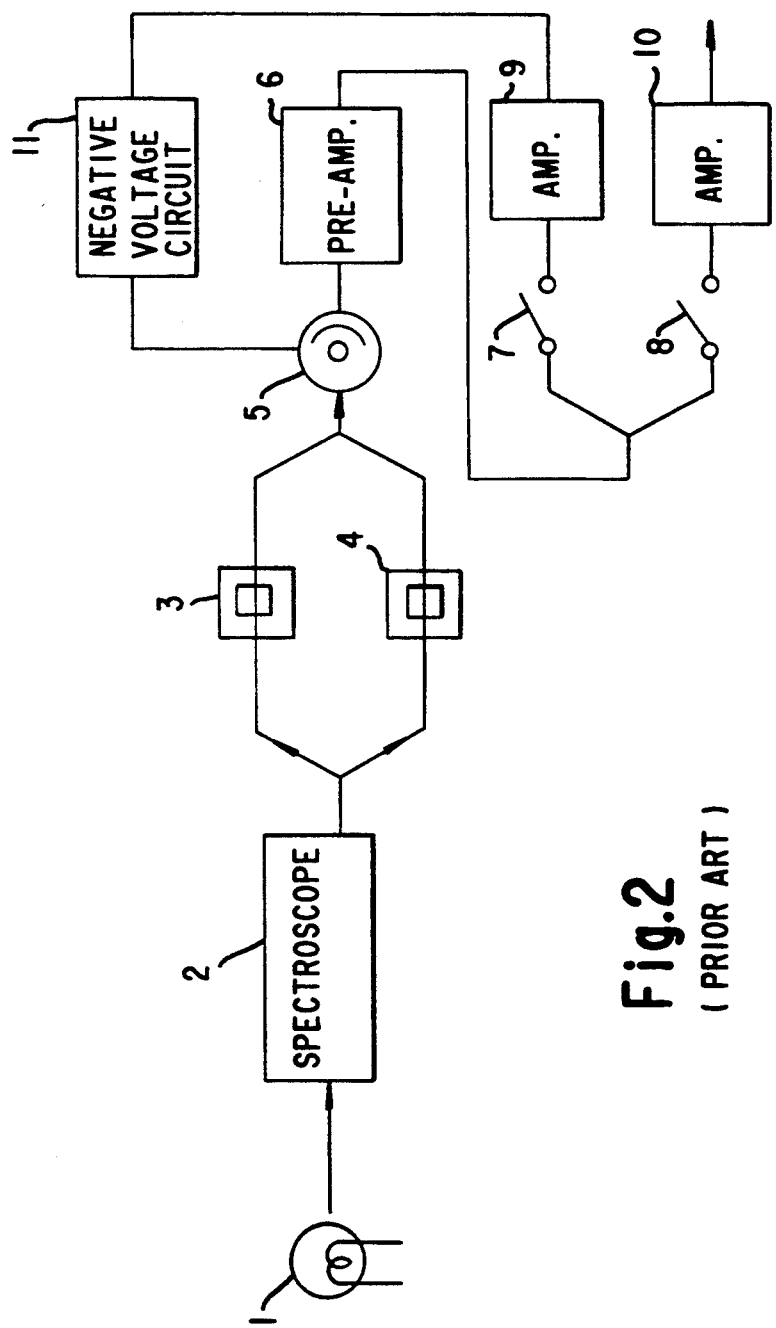
FIG. 2 is schematic diagram of a spectorophotometer of the prior art.

FIG. 1 is a schematic diagram of a spectrophotometer as a preferred embodiment of the present invention. In FIG. 1, the elements like those in FIG. 2 are designted by the like reference numerals. Namely the light beam from the light source 1 is separated depending on the wavelengths by the spectroscope 2 and are chopped into the first and second light beams. The first beam passes through the reference cell 3, while the second beam passes through the sample cell 4, these first and second beams are alternately received by the photodiode 15. A light current of photodiode 15 is amplified by the preamplifier 6 and then by the variable gain amplifier 17. Thereafter, the signals are converted to the digital signal via the A/D converter 18 and are output to the bus line 21. The bus line 21 is connected with a gain setting port 19 and CPU 20. The reference and sample signal outputs of the A/ D converter are controlled by CPU 20 so that these are output synchronously with the chopping of the photodiode. When the reference signal is output, the gain setter output port 19 sets the gain of variable gain amplifier 17 depending on the output signal value. When the outputs of photodiode 15 and A/D converter 18 are defined as the sample signals by the preset gain, the light signal to the sample cell received by the photodiode 15 is amplified by the preamplifier 16, amplified by the variable gain amplifier 17 depending on the preset gain and is then output through the A/D converter 18.

In this case, however, the spectrophotometer of the present invention can change the gain of variable gain amplifier 17 only in the step by step and therefore presents a problem that the reference signal is not perfectly kept at a constant level continuously. Therefore, it is necessary to conduct division of the sample signal with the reference signal in order to obtain a high transmittance signal. But, accroding to the embodiment, since the photodiode is used as the detector 15, the apparatus can be constituted very economically in comparison with the case of using the photomultiplier.

According to the present invention since a photodiode is used as a detector, an output of the A/D converter is extracted synchronously with the chopping of the reference beam and sample beam incident to the photodiode, the gain of variable gain amplifier is set depending on an output value of the A/D converter of reference signal and the sample signal is amplified by the variable gain amplifier with the same gain on the occasion of guiding the sample signal, and thus the detector is capable of using a photodiode which is very economical comparison with the photomultiplier used in the prior art, and moreover, a negative voltage circuit is unnecessary unlike the spectrophotometer of the prior art and thereby a very economical spectrophotometer can be realized as a whole.

What is claimed is:

1. A spectrophotometer, comprising:
   a light source;
   a spectroscope for separating light from the light source into different wavelengths and for chopping the light from the light source into first and second light beams which pass through a reference cell and a sample cell, respectively;
   a photodiode for alternately receiving light beams from said reference cell and said sample cell;
   a variable gain amplifier for amplifying a light current output from said photodiode;
   an A/D converter for converting reference cell outputs and sample cell outputs from said variable gain amplifier into digital values synchronously with the chopping period;
   a gain setting means for setting the gain of said variable gain amplifier in response to a variable reference cell output value from said A/D converter in order to amplify sample cell signals to be output via said A/D converter; and
   means for dividing the sample signal output from the A/D converter with the variable reference cell output from the A/D converter.

* * * * *